(No Model.)

H. CORREJA.
PHOTOGRAPHIC APPARATUS.

No. 318,701. Patented May 26, 1885.

WITNESSES:
Donn Twitchell.
C. Sedgwick

INVENTOR:
H. Correja
BY Munn & Co.
ATTORNEYS.

UNITED STATES PATENT OFFICE.

HENRY CORREJA, OF PARIS, FRANCE.

PHOTOGRAPHIC APPARATUS.

SPECIFICATION forming part of Letters Patent No. 318,701, dated May 26, 1885.

Application filed June 9, 1884. (No model.)

*To all whom it may concern:*

Be it known that I, HENRY CORREJA, of Paris, France, have invented certain new and useful Improvements in Photographic Apparatus, of which the following is a full, clear, and exact description.

The invention is designed to be used in connection with a photographic camera for taking instantaneous views; and it has for its purpose the placing of the object to be taken with unerring certainty in the center of the sensitive plate; and by it I am enabled to take with increased facility pictures of objects while holding the camera in the hand, or even in the act of walking, and by a camera fitted with it and with a drop-shutter pictures of moving animals and groups of people in crowded cities may readily be taken without causing any obstruction and without even attracting attention, so that groups thus unconsciously photographed are true to life and free from stiffness or "pose," which are very desirable artistic qualities.

The invention mainly consists in a laterally-arranged and adjustable independent tubular attachment to the camera having its forward end near the lens of the instrument and fitted internally at or near said end with horizontal and vertical strips or "cross-hairs," arranged to cross each other at right angles in the center of the tube, so as to divide the field in the tube into four equal parts, and provided at or near its rear end with two similar cross-strips or cross-hairs arranged diagonally relatively to the cross-hairs at the forward end of the tube. This device, which is intended for "sighting" by the operator, I term a "finder," inasmuch as by it I find by sighting through it the exact period at which the drop-shutter should be operated to place the object in the center of the sensitive plate, without any focusing of the camera when taking the picture. In connection with this attachment, or for use in concert therewith, the ground glass of the camera has penciled or marked upon it lines corresponding, as regards arrangement, with the horizontal vertical and diagonal cross-hairs of the attachment, the object of which will be hereinafter explained.

Reference is to be had to the accompanying drawings, forming part of this specification, in which similar letters of reference indicate corresponding parts in all the figures.

Figure 1:
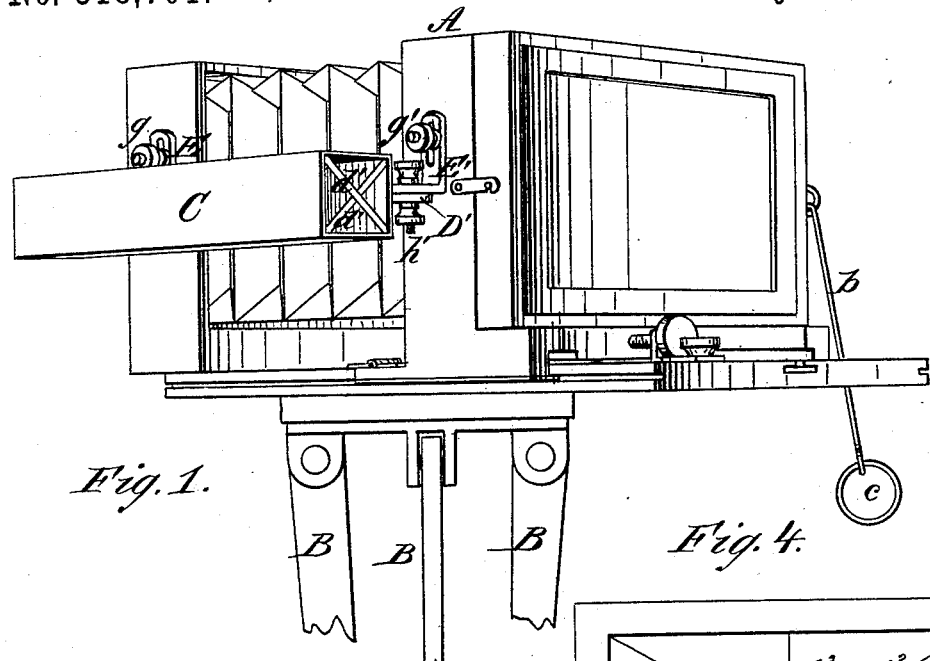
Figure 4:
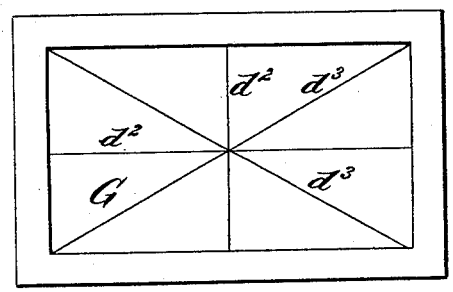
Figure 2:
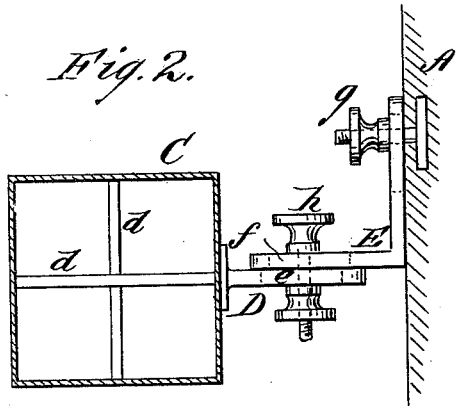
Figure 3:
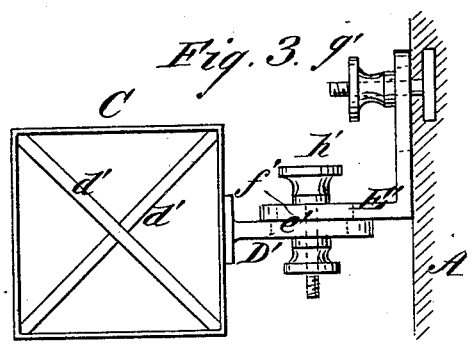

Figure 1 represents a view in perspective of a photographic camera having my invention applied; Fig. 2, a transverse section, upon a larger scale, of the tubular attachment or finder near its forward end, with devices for holding and adjusting it. Fig. 3 is a rear end view of said attachment with similar holding and adjusting devices; and Fig. 4, a face view of the ground glass used in the camera.

A is a photographic camera suitable for taking instantaneous pictures, and with its legs B B pivoted or attached so as to be readily folded up or brought together for the purpose of forming a handle by which to hold the instrument in the one or left hand when taking the picture.

The drop-shutter of the instrument may have the usual spring-handle; but instead of being released by a touch of the finger on said handle, which necessitates reaching the hand in front as far as the lens, it will be found much more convenient, when holding the instrument by its legs and using it as I do, to release the shutter by a cord, *b*, attached to the handle and passing through suitable loops to the back of the instrument, where it may be provided with a ring, *c*, through which the forefinger of the hand not employed in carrying the instrument may be passed, and be rapidly and steadily closed into the hand, like pressing the trigger of a gun, when it is required to release the shutter for the taking of the picture, as hereinafter described.

The peculiar attachment which forms the main subject of my invention consists of a tube, C, which may be square, round, or any other suitable shape in its transverse section, but preferably square, inasmuch as that shape will assist in guiding the eye to keep the camera vertical. Its size may be varied; but while it may need only be of small dimensions in cross-area it should be of such length proportioned to the camera on the one side of which it is arranged to protrude at both its ends through the holes in the usual black cloth which is used on the camera, and which, when rapid gelatine plates are used in the open air, should always envelop the camera. Its forward end, which is near the lens of the instrument, has secured or arranged a little within it cross-hairs $d\ d$, that may consist of two narrow strips of metal or other material, with their faces or flat sides toward the back end of the tube—that is, facing the operator as he "sights" through the tube. These cross hairs or strips are arranged, the one of them vertical and the other horizontal, and so that they cross each other at right angles, or thereabout, dividing the "field" in the tube into four equal parts. The back end of said tube C is also divided into four equal parts by like cross hairs or strips $d'\ d'$; but these are arranged diagonally relatively to the tube, or rather to the horizontal and vertical positions of the front cross hairs or strips, $d\ d$. This tube C, thus fitted with suitably-arranged dividing cross hairs or strips, I term the "finder." To it on the outside are secured two bars, D D', having slots $e\ e'$ in them, and arranged at suitable distances apart, according to the size of the camera, while in grooves opposite them and connected with the camera are two other bars, E E', having corresponding slots, $f\ f'$, and which bars slide up and down and are secured by binding-screws $g\ g'$. These several bars D D' and E E' overlap one another at their slotted portions $e\ e'\ f\ f'$, and are furthermore connected with each other at such parts by binding-screws $h\ h'$.

G is the ground glass of the camera, which has penciled or marked upon it lines $d^2\ d^3$, corresponding as regards arrangement with the horizontal, vertical, and diagonal cross-hairs of the tubular attachment C, and crossing each other in the center of the glass.

Before proceeding to take an instantaneous photograph an object is focused in the camera on the ground glass G in the usual manner. The operator then looks with one eye through the finder or tube C from the rear end thereof, and adjusts or moves said tube sidewise at either end, and up and down, by means of the slotted bars D D' and E E', until the cross-hairs or dividing-strips $d\ d'$ occupy the same relation to the object focused as the pencil-marks $d^2\ d^3$ on the ground glass did, or, in other words, until the object focused is divided in the same manner by the cross-hairs in the tube C as it was by the pencil-lines on the ground glass. The binding-screws $g\ g'$ and $h\ h'$ are then set. This puts the instrument, with its attachment, in position ready for use, and so that when the camera is pointed at an object to be photographed the finder or attachment insures absolute certainty in placing said object properly on the sensitive plate, the operator, when it comes within range or is brought within range by walking toward it, raising the camera and sighting the object through the tube C, and, as it is properly placed in the field of the tube by means of the cross hairs or strips therein, actuating the drop-shutter by closing the finger of his hand on the ring $c$ as he carries the instrument by its shut legs with the other hand. This manipulation of the instrument, with its attachment, will in skillful hands be very much like that of directing and using a fowling-piece or gun, and that there must be absolute certainty in properly placing the object on the sensitive plate will be evident from the fact that after the attachment or finder has been adjusted, as described, the object will have the same relative position on the sensitive plate that it had in the field of the finder when the shutter was operated.

Instead of the forward support of the finder being a rigid attachment, it might consist of a mere band arranged to surround the tube with sufficient freedom to admit of the tube sliding in and out, so as to freely allow of the opening and shutting of the bellows of the camera. Furthermore, if desired, holes may be pierced in proper places for the insertion of the binding-screws $g\ g'$ on another side of the camera to admit of the latter being turned so that upright pictures may be taken, said holes when not in use being properly covered to exclude the light.

Having thus described my invention, what I claim as new, and desire to secure by Letters Patent, is—

1. The combination, with a camera for rapid or instantaneous photographing, of an attached sighting-tube arranged outside of or to one side of the instrument provided with cross hairs or strips, dividing the field within it, and adjustable relatively to the camera to properly place the object on the sensitive plate of the camera as it appears in corresponding position on the field within said tube, substantially as specified.

2. The finder or side tubular attachment, C, constructed with vertical and horizontal cross hairs or strips $d\ d$ at or near its one end and diagonal cross hairs or strips $d'\ d'$ at or near its opposite end, for use in connection with a camera adapted to produce rapid or instantaneous photographing, essentially as described.

3. The ground glass G of the camera, having vertical, horizontal, and diagonal pencil or other marks, $d^2\ d^3$, upon it, in combination with the tube C, adjustably connected with the camera on its outside, and provided at or near its one end with vertical and horizontal cross hairs or strips $d\ d$, and at or near its other end with diagonal cross hairs or strips $d'\ d'$, substantially as and for the purposes herein set forth.

4. In combination with the camera, the tube C, with its vertical, horizontal, and diagonal cross hairs or strips $d\ d'$, arranged as described, and the adjusting slotted bars D D' and E E', essentially as and for the purposes described.

HENRY CORREJA.

Witnesses:
E. L. WEEKS,
ROBT. M. HOOPER.